US012647280B2

(12) United States Patent
Jeda et al.

(10) Patent No.: US 12,647,280 B2
(45) Date of Patent: Jun. 2, 2026

(54) DIGITAL SIGNATURE BATCH VERIFICATION

(71) Applicant: International Business Machines Corporation, Armonk, NY (US)

(72) Inventors: Lukasz Tomasz Jeda, Cracow (PL); Grzegorz Piotr Szczepanik, Cracow (PL); Andrzej Pietrzak, Cracow (PL); Piotr Kalandyk, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 18/771,756

(22) Filed: Jul. 12, 2024

(65) Prior Publication Data

US 2026/0019273 A1     Jan. 15, 2026

(51) Int. Cl.
  *H04L 29/06*          (2006.01)
  *H04L 9/32*           (2006.01)
(52) U.S. Cl.
  CPC ................................. *H04L 9/3247* (2013.01)
(58) Field of Classification Search
  CPC ... H04L 63/1425; G06F 21/62; G06F 21/6245
  See application file for complete search history.

(56) References Cited

U.S. PATENT DOCUMENTS 7,178,029 B2    2/2007  Ansper et al.
8,949,997 B2    2/2015  Schmidt et al.

10,091,004 B2    10/2018  Ryu et al.
2002/0184504 A1  12/2002  Hughes
2014/0281511 A1*  9/2014  Kaushik ................ H04L 63/062
                                                713/164
2015/0347734 A1* 12/2015  Beigi .................... H04L 9/3268
                                                726/28
2019/0288850 A1*  9/2019  Beecham ............ G06F 21/6209
(Continued)

FOREIGN PATENT DOCUMENTS

CN        103441845 A     12/2013
CN        108173651 A      6/2018
(Continued)

OTHER PUBLICATIONS

Wikipedia, "Merkle signature scheme," Wikipedia, 2023, 3 pages, retrieved from https://en.wikipedia.org/wiki/Merkle_signature_scheme.

(Continued)

*Primary Examiner* — Ka Shan Choy
(74) *Attorney, Agent, or Firm* — Stosch Sabo

(57) ABSTRACT

A computer-implemented method, according to one approach, includes: initializing a one-time digital signature scheme across two or more leaf nodes by: creating and sending instances of the one-time digital signature scheme to the respective leaf nodes. In response to receiving a request for data from a source, where portions of the requested data being stored across the leaf nodes, portions of the data request are distributed to the corresponding leaf nodes. Signed copies of the requested portions of data are further received from the leaf nodes. The received signed copies are formed using the instances sent to the respective leaf nodes. Moreover, the signed copies are sent to the source.

19 Claims, 7 Drawing Sheets

(56) References Cited

U.S. PATENT DOCUMENTS

| | | | |
|---|---|---|---|
| 2022/0129155 A1* | 4/2022 | Kasso | ................. G06F 11/1464 |
| 2025/0158992 A1* | 5/2025 | Park | ..................... H04L 63/108 |

FOREIGN PATENT DOCUMENTS

| | | |
|---|---|---|
| CN | 116707766 A | 9/2023 |
| WO | 202316728 A1 | 2/2023 |

OTHER PUBLICATIONS

Wikipedia, "Lamport signature," Wikipedia, 2023, 5 pages, retrieved from https://en.wikipedia.org/wiki/Lamport_signature.
Wikipedia, "SHA-2," Wikipedia, 2024, 10 pages, retrieved from https://en.wikipedia.org/wiki/SHA-2.

* cited by examiner

100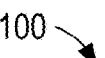

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED DIGITAL SIGNATURE CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Is a full batch of signed data portions ready to be verified?

NO

YES

Compute a value for each leaf node of a tree structure          354

Use the leaf nodes values to compute the remaining values in the tree structure          356

Verify authenticity of the received data          358

DIGITAL SIGNATURE BATCH VERIFICATION

BACKGROUND

The present invention relates to data encryption, and more specifically, this invention relates to improving digital signature implementation.

Data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments. For example, signature schemes are a core cryptographic building block that provides authentication over networks, e.g., like the Internet.

However, conventional cryptographic schemes have suffered from inefficiencies stemming from a number of factors. One significant contribution to inefficiencies experienced by conventional schemes involves the length of signatures that are implemented. This introduces unwanted latency stemming from the increased compute overhead associated with forming and interpreting these lengthy signatures, as well as undesirably consuming a significant amount of network bandwidth. While attempts to overcome such attacks have been made, they have all fallen short of providing solutions.

SUMMARY

A computer-implemented method (CIM), according to one approach, includes: initializing a one-time digital signature scheme across two or more leaf nodes by: creating and sending instances of the one-time digital signature scheme to the respective leaf nodes. In response to receiving a request for data from a source, where portions of the requested data being stored across the leaf nodes, portions of the data request are distributed to the corresponding leaf nodes. Signed copies of the requested portions of data are further received from the leaf nodes. The received signed copies are formed using the instances sent to the respective leaf nodes. Moreover, the signed copies are sent to the source.

A computer program product (CPP), according to another approach, includes: a set of one or more computer-readable storage media. The CPP also includes program instructions that are collectively stored in the set of one or more storage media, and for causing a processor set to perform the foregoing CIM.

A computer system (CS), according to yet another approach, includes: a processor set, and a set of one or more computer-readable storage media. The CS further includes program instructions that are collectively stored in the set of one or more storage media, and for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2:
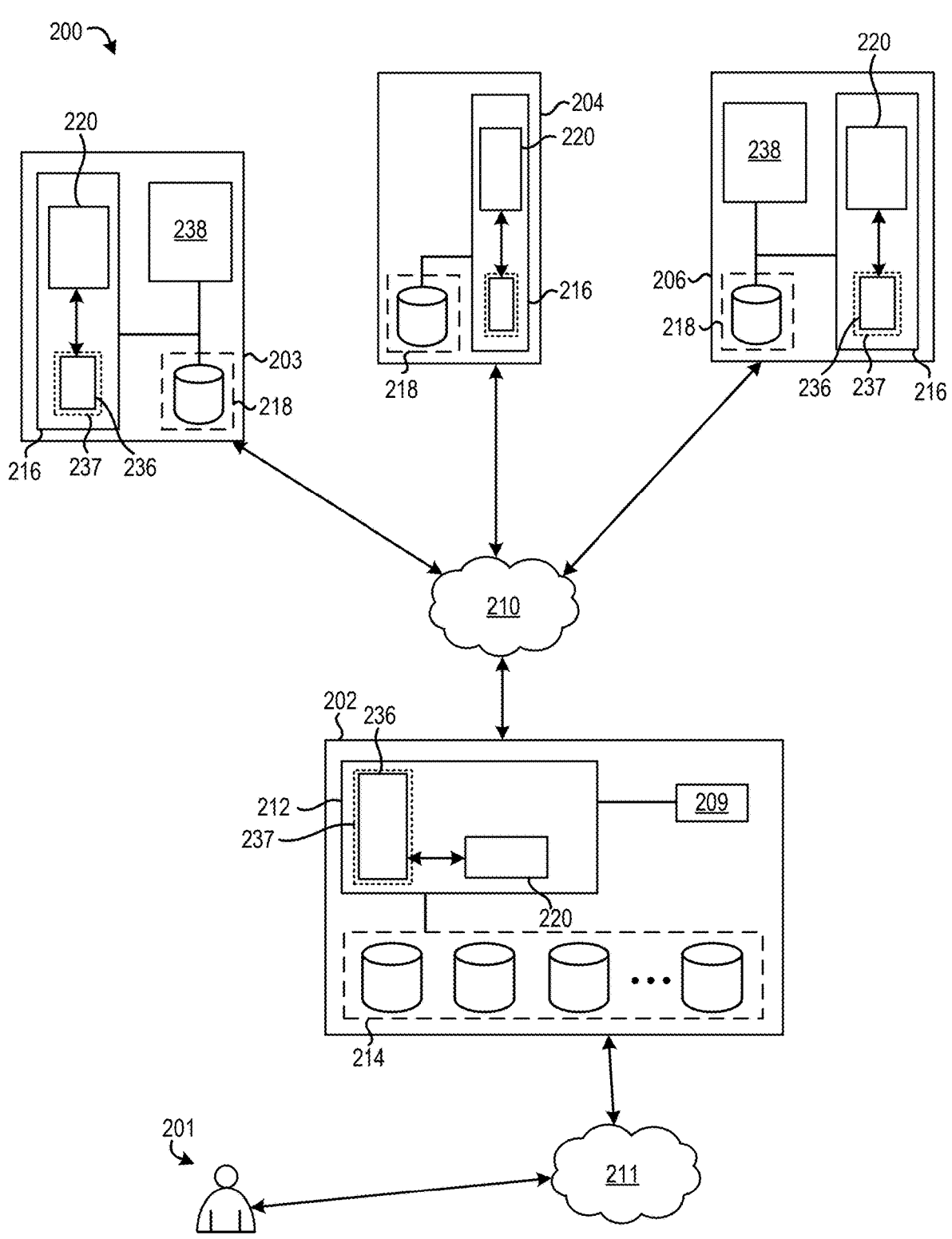
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for performing batch digital signature verification. Approaches herein are thereby able to significantly reduce the size of the signatures that are used, which in turn reduces compute overhead, network traffic, latency, etc., thereby improving performance overall. Moreover, signed portions of data have a consistent length, which causes the length of such digital signatures to not scale, e.g., as will be described in further detail below.

In one general approach, a CIM includes: initializing a one-time digital signature scheme across two or more leaf nodes by: creating and sending instances of the one-time digital signature scheme to the respective leaf nodes. In response to receiving a request for data from a source, where portions of the requested data being stored across the leaf nodes, portions of the data request are distributed to the corresponding leaf nodes. Signed copies of the requested portions of data are further received from the leaf nodes. The received signed copies are formed using the instances sent to the respective leaf nodes. Moreover, the signed copies are sent to the source.

In another general approach, a CPP includes: a set of one or more computer-readable storage media. The CPP also includes program instructions that are collectively stored in the set of one or more storage media, and for causing a processor set to perform the foregoing CIM.

In still another general approach, a CS includes: a processor set, and a set of one or more computer-readable storage media. The CS further includes program instructions that are collectively stored in the set of one or more storage media, and for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved digital signature code at block 150 for performing batch digital signature verification. Approaches herein are thereby able to significantly reduce the size of the signatures that are used, which in turn reduces compute overhead, network traffic, latency, etc., thereby improving performance overall. Moreover, signed portions of data have a consistent length, which causes the length of such digital signatures to not scale, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud exposes them to significant security risks. For example, the process of moving certain workloads to cloud for computation efficiency assumes (e.g., requires) the cloud to be secure. Cryptography allows for some security to be introduced to workloads and data that are exposed to public environments. For example, signature schemes are a core cryptographic building block that provides authentication over networks, e.g., like the Internet.

However, conventional cryptographic schemes have suffered from inefficiencies stemming from a number of factors. One significant contribution to inefficiencies experienced by conventional schemes involves the length of signatures that are implemented. This introduces unwanted latency stemming from the increased compute overhead associated with forming and interpreting these lengthy signatures, as well as undesirably consuming a significant amount of network bandwidth.

In sharp contrast to these conventional shortcomings, approaches herein are able to significantly reduce the size of signatures that are used to cryptographically secure data. Moreover, this reduction in signature size is done without sacrificing data security. This allows for approaches herein to store data in a distributed fashion such that data may be retrieved and protected (e.g., signed) in parallel, thereby further reducing latency experienced across a system, e.g., as will be described in further detail below.

Looking now to FIG. 2, a distributed data storage system 200 in accordance with one approach. As an option, the present system 200 may be implemented in conjunction with features from any other approach listed herein, such as those described with reference to the other FIGS. However, this distributed data storage system 200 (e.g., distributed network) and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the distributed data storage system 200 includes a central server 202 that is connected to remote device 204 and edge nodes (e.g., servers) 203, 206. Specifically, the central server 202, remote device 204, and edge nodes 203, 206 are connected to a network 210 that allows for data (e.g., information, commands, requests, instructions, responses, encrypted data, etc.) to be sent between any of the locations 202, 203, 204, 206. The central server 202 is also connected to a client 201 on network 211. It should be noted that although client 201 is illustrated in FIG. 2 as an individual, this is in no way intended to be limiting. In other approaches, the client 201 may be one or more physical machines (e.g., computer), one or more virtual machines, an organization, etc.

The networks 210, 211 may be of any type, e.g., depending on the desired approach. For instance, in some approaches either or both of the networks 210, 211 may be a WAN, e.g., such as the Internet. However, an illustrative list of other network types which networks 210, 211 may implement includes, but is not limited to, a LAN, a PSTN, a SAN, an internal telephone network, etc. As a result, any desired information, data, commands, instructions, responses, requests, etc. may be sent between the client 201 and locations 202, 203, 204, 206, regardless of the amount of separation which exists therebetween, e.g., despite being positioned at different geographical locations. It should also be noted that the different locations 202, 203, 204, 206 may be connected to each other (and/or other locations) differently depending on the approach. According to an example, two host locations may be located relatively close to each other and connected by a wired connection, e.g., a cable, a fiber-optic link, a wire, etc.; etc., or any other type of connection which would be apparent to one skilled in the art after reading the present description.

While being connected to networks 210, 211 allows client 201 and locations 202, 203, 204, 206 to communicate with each other, it also exposes any information sent over the networks 210, 211 to attacks. Cryptographic digital signatures (also referred to herein as "digital signatures") have thus been developed in order to ensure authenticity of information, regardless of how it may be received. It follows that digital signatures are essentially mathematical schemes that allow the authenticity of information (e.g., digital messages and/or documents) to be verified. In other words, a verified digital signature accompanying data gives a recipient confidence that the message came from trusted (e.g., known) sender.

Digital signature schemes as used in the approaches herein may implement (e.g., utilize) cryptographic digital signature keys. Depending on the approach, these keys may be formed using a key generation algorithm and stored in memory. Moreover, the keys may be formed in pairs of private and public keys. A signing algorithm that, given a message and a private key, thereby produces a digital signature. This digital signature may also be verified by a signature verifying algorithm based at least in part on the message, the public key, and the digital signature.

As alluded to above, the secure storing and sharing of the sensitive data (e.g., information) are areas of great interest in the modern world. This is particularly true in situations where protected data that is at rest and/or in transit can be the subject of an attack performed by an "eavesdropper" or other adversary trying to gain unauthorized knowledge about the protected data. It is also desirable to ensure data authenticity and integrity, so that an entity with possession of that sensitive information can verify the digital records have not been tampered with. Approaches herein thereby implement a dial step process. The first step involves encrypting data using one or more encryption mechanisms. Moreover, the second step involves augmenting the encrypted data with verification data using a digital signature scheme.

Approaches involving digital signature schemes typically include of three main parts: (i) public data used by a signer (also referred to herein as "PU"), (ii) private data used by the signer (also referred to herein as "PR"), and (iii) the signature (also referred to herein as "DS"). In some approaches, the signer generates the public (PU) and private (PR) data during the process of setting up the digital signature scheme, and publishes the public data so that every interested party can access information (e.g., knowledge) about the scheme. However, the private data cannot be freely shared without compromising the signature scheme. It follows that in situations where data (DA) is being signed with a cryptographic signature, the signer preferably uses the private data to generate the signature (DS) which is then appended to the data that is signed. In some approaches, the signature creation process uses the data being signed as an input. Accordingly, the output signature is different for different data.

The approaches herein are desirably able to apply digital signature scheme considerations to distributed data storage systems. In other words, approaches herein are able to store sensitive data in a distributed environment while also ensuring the data is cryptographically protected. Moreover, this data protection does not come at a cost to performance, as latency, network bandwidth, compute overhead, etc. are significantly reduced. In addition, while approaches herein implement batch digital signature verification (also referred to herein as "batch verification") rather than being able to verify individual signatures (e.g., at least some approaches herein may be unable to verify cryptographic signature received from a single location), the length of the digital signatures used by approaches herein is significantly shorter than previously achievable. Signed portions of data also have a consistent length, e.g., as will be described in further detail below.

With continued reference to FIG. 2, it follows that the client 201 may issue a data request that is received at central server 202. In some approaches, the client 201 submits the data request using an application that is running at the client location, e.g., on a computer. In response to receiving the data request, central server 202 may locate where the data being requested is physically stored. In other words, while a data request may include (e.g., reference) a single file that is stored at a single logical location, the data itself may be distributed across different physical locations, e.g., such as remote device 204 and/or edge nodes 203, 206. This improves data retention by reducing the likelihood of experiencing a total data loss, while also improving performance by allowing for multiple portions of data (e.g., that are logically related to each other) to be accessed and returned in parallel, e.g., as would be appreciated by one skilled in the art after reading the present description.

Thus, in response to determining that a data request received from client 201 involves data stored at two or more of the remote locations 203, 204, 206, the central server 202 may distribute portions of the data request to the corresponding remote locations. The central server 202 preferably has a one-time digital signature scheme (e.g., algorithm) initialized across two or more of the remote locations 203, 204, 206. This may be achieved by creating and sending instances of the initialized (e.g., chosen) one-time digital signature scheme to each of the remote locations 203, 204, 206. In other words, a single instance of the one-time digital signature scheme is sent to each of the remote locations 203, 204, 206 that are connected to the central server 202 and which include at least a portion of the requested data.

This desirably spreads the ability to create cryptographic signatures across two or more different (and often distant or separated) locations, which significantly shortens the individual digital signature length, thereby reducing compute overhead, overall latency, etc. It should also be noted that the remote locations 203, 204, 206 are also referred to herein as "leaf nodes," and the central server 202 is also referred to as a "central node" herein. Moreover, signed portions of data have a consistent length, which causes the length of such digital signatures to not scale. In other words, the length of signed copies of data remain constant, regardless of the number of leaf nodes the signed copies are received from.

With continued reference to FIG. 2, the remote device 204 and edge nodes 203, 206 may have different configurations than the central server 202. For example, in some implementations the central server 202 includes a large (e.g., robust) processor 212 coupled to a cache 209 and memory 214 having a relatively high storage capacity. The central server 202 is thereby able to process and store a relatively large amount of data, allowing it to be connected to, and manage, multiple different remote locations. The central server 202 may also be configured to receive and/or generate cryptographic signature keys, e.g., as part of a one-time digital signature scheme.

It should be noted that with respect to the present description, "data" and "information" may include any desired type of details. For instance, in different implementations data and information can include raw sensor data, metadata, program commands, instructions, outputs generated by trained artificial intelligence based models, etc. Moreover, while implementations herein are described in the context of data that has been authenticated (e.g., protected) with a digital signature, data may also be processed differently depending on the approach. In other approaches, data may be compressed before being signed with a digital signature, e.g., to reduce memory consumption. In still other approaches, the data may be converted to a different format, type of information, etc. before being stored in memory, used to train one or more AI based models, used to generate new cryptographic signature keys, etc.

The way that data is protected has an impact on how that data may be processed and/or stored. For instance, the processor 212 may use a secure software environment 236 to process (e.g., aggregate) incoming encrypted data and/or generate encrypted data. In other words, the secure software environment 236 may be designated to generate, store, apply, etc., cryptographic signature keys. The secure software environment 236 may thereby be able to apply digital signatures to data and/or verify digital signatures that are received. It follows that the secure software environment 236 may only be accessed by verified (e.g., known) sources to secure the cryptographic signature keys. According to a non-limiting example, secure engine 220 may be designated (e.g., verified) to cross a logical boundary 237 separating the secure software environment 236 from the remainder of the processor 212 and central server 202 in general. In other words, a logical boundary 237 may only be crossed by secure engine 220, and the logical boundary 237 prevents any other aspects of the processor 212 from accessing the secure software environment 236 or any data being processed (e.g., digitally signed) therein. Software being run outside the logical boundary 237—other than any software running in the secure engine 220—is thereby unable to directly access any data being processed by software running in the secure software environment 236.

The ability to insulate the secure software environment 236 from exterior access effectively hides any data sent to and/or generated at the secure software environment 236. Thus, although the secure software environment 236 is located at the central server 202, it may implement confidential details (e.g., pairs of private and public cryptographic signature keys without exposing them to the central server 202 and/or entities connected thereto, e.g., such as an administrator (not shown). According to an example, the secure software environment 236 may include one or more private keys configured to encrypt and/or decrypt data according to an encryption standard. The secure software environment 236 may thereby be able to decrypt encrypted data and process (e.g., deduplicate and/or compress) the decrypted data without exposing any of the decrypted data and/or private key information to a remainder of the processor 212, e.g., as will be described in further detail below. Accordingly, the processor 212, secure engine 220, and/or the secure software environment 236 therein may be used to perform one or more operations in method 300 of FIG. 3A below.

Referring still to FIG. 2, each of the remote device 204 and the edge nodes 203, 206 also include a logical boundary 237 separating the secure software environment 236 from a remainder of the respective processors 216, 217. Secure engine 220 is also able to cross the logical boundary 237 and access protected information. Accordingly, each of the remote locations 203, 204, 206 are capable of (e.g., configured to) cryptographically signing data locally. In some approaches, the processor 216, secure engine 220, and/or the secure software environment 236 of the remote device 204 may be used to perform one or more operations in method 300 of FIG. 3A below. In other approaches, the processor 217, secure engine 220, and/or the secure software environment 236 of one or more of edge nodes 203, 206 may be used to perform one or more operations in method 300 of FIG. 3A below.

Looking to edge nodes 203, 206, some of the components included therein may be the same or similar to those included in remote device 204, and have therefore been given corresponding numbering. For instance, processor 217 is coupled to memory 218. Additionally, the processor 217 is coupled to an AI module 238. The AI module 238 may include any desired number and/or type of AI-based models, e.g., such as machine learning models, deep learning models, neural networks, etc. Moreover, the models may be trained to perform certain procedures (e.g., identify patterns), e.g., as would be appreciated by one skilled in the art after reading the present description. In some approaches, one or more models may be trained to identify and/or generate various cryptographic values for one-time digital signature schemes, e.g., as will be described in further detail below.

Figure 3A:
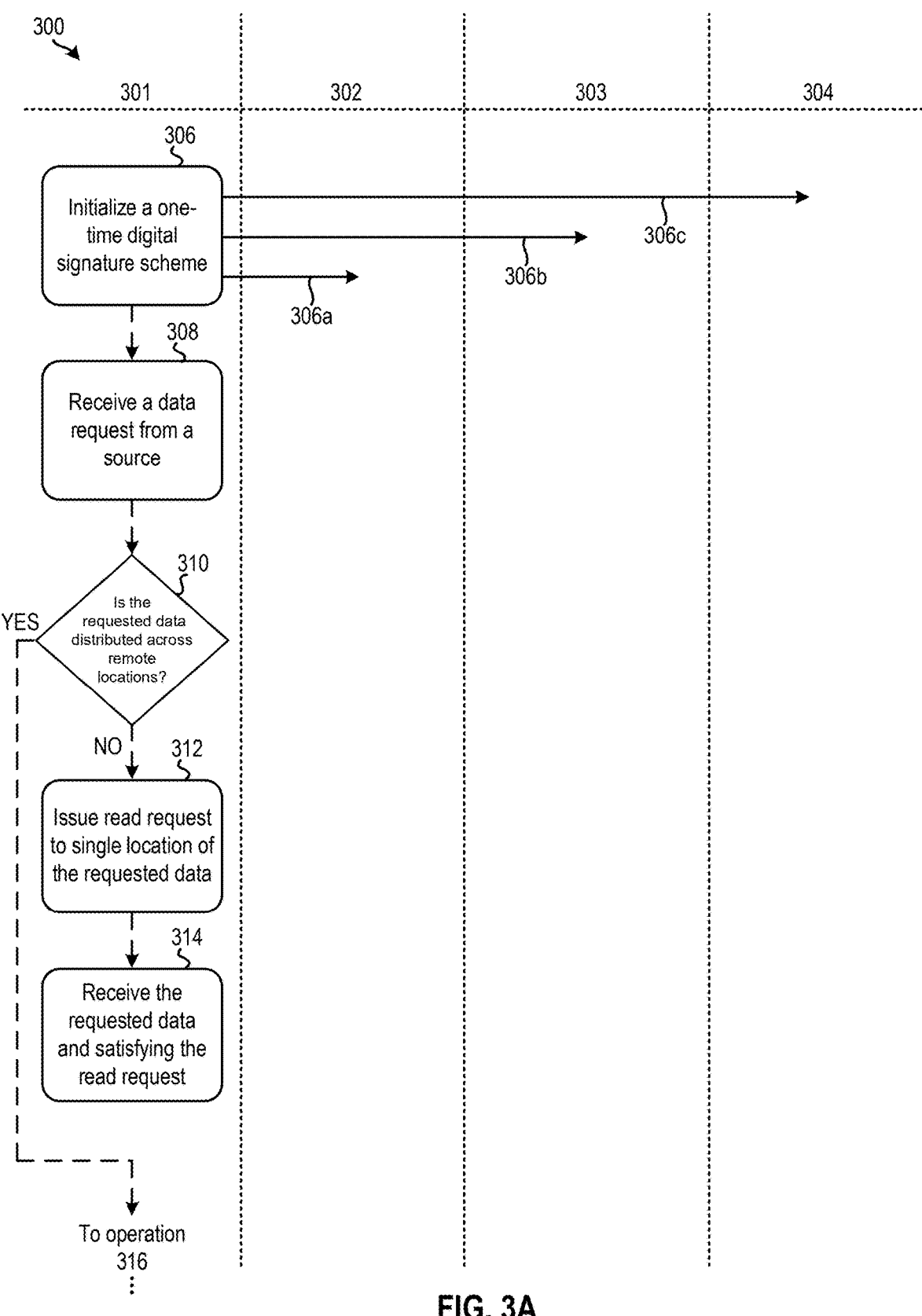
FIG. 3A is a flowchart of a method, in accordance with one approach.
Figure 3A:
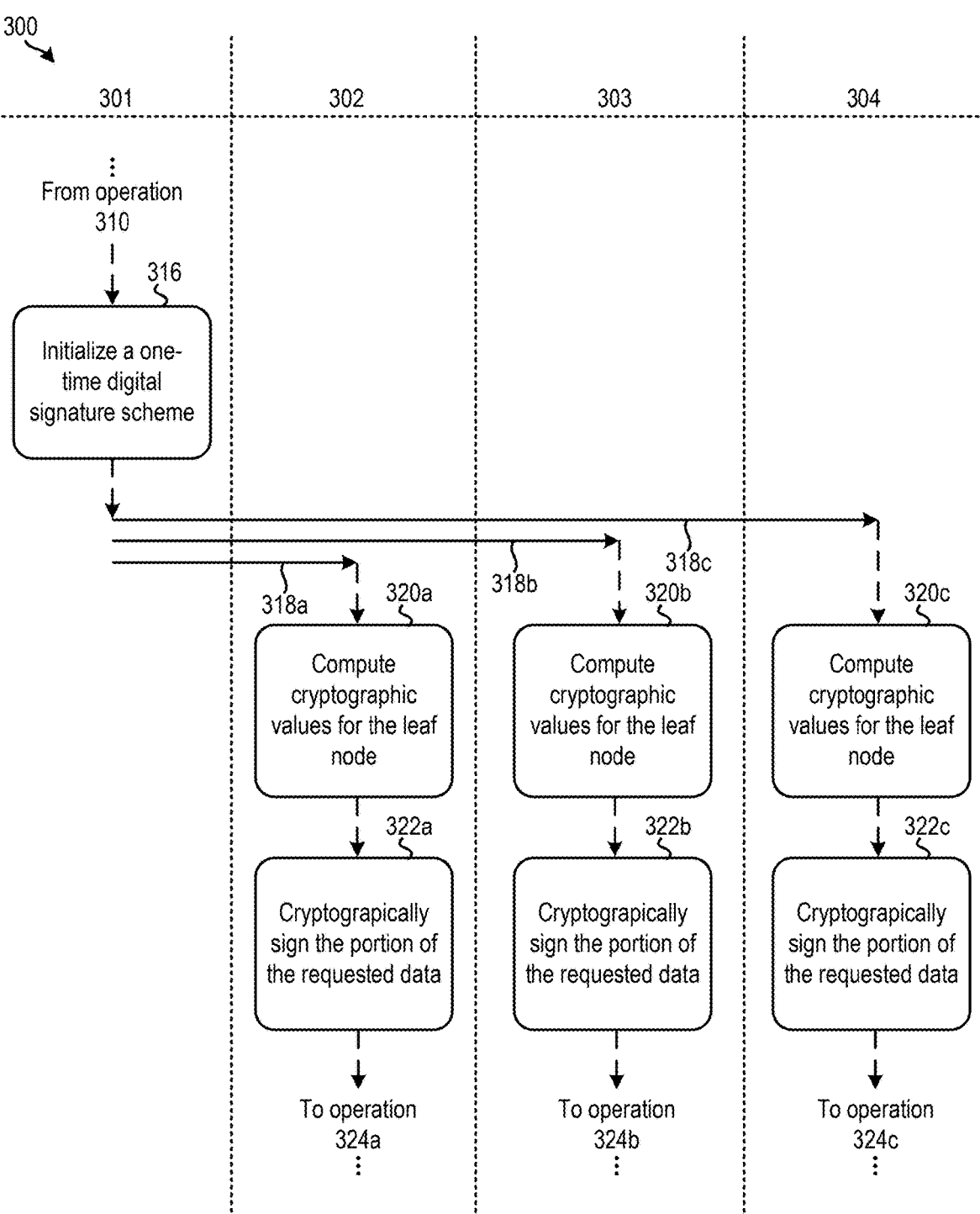
Figure 3A:
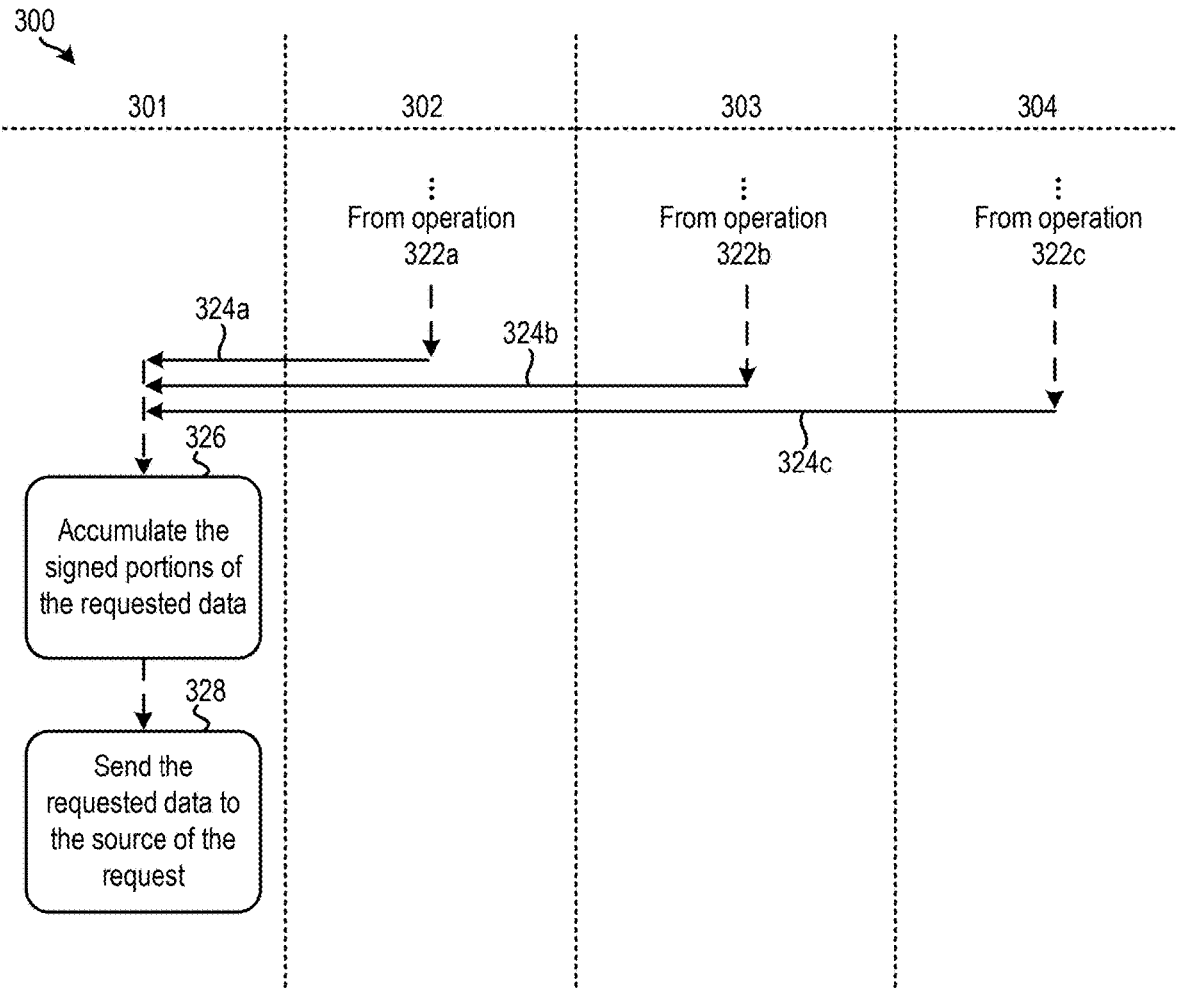

Looking now to FIG. 3A, a flowchart of a computer-implemented method 300 for performing batch digital signature verification is illustrated in accordance with one approach. The method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions. Each of the operations in method 300 may be performed by any suitable component of the operating environment. For example, the nodes 301, 302 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, 304, each of which represent one or more processors, controllers, computers, etc., positioned at a different location in a distributed system. For example, in some approaches one or more of the operations in method 300 may involve one or more physical components in a leaf node of a distributed system, the leaf node having a secure engine that is connected to a secure software environment and protected area of memory. The leaf node may further be one of a plurality that are coupled to a central server as part of a larger distributed system. Accordingly, node 301 may include one or more processors which are located at a central server of a distributed system (e.g., see processor 212 of FIG. 2). Node 302 may include one or more processors which are located at a first leaf node (e.g., see processor 217 in edge node 203 of FIG. 2). Moreover, node 303 may include one or more processors positioned at a second leaf node (e.g., see processor 216 in remote device 204 of FIG. 2), while node 304 includes one or more processors at a third leaf node (e.g., see processor 217 in edge node 206 of FIG. 2).

Accordingly, commands, code, data, metadata outlining code updates, etc., may be sent between the nodes 301, 302, 303, 304, depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

As shown, operations 306 is performed at node 301. There, operation 306 includes initializing a one-time digital signature scheme. In other words, operation 306 includes selecting and implementing a one-time digital signature scheme. The one-time digital signature scheme that is initialized may be predetermined (e.g., preset) in some approaches by a user or administrator, based on industry standards, based on the type of system, etc. In some approaches, operation 306 includes establishing a Merkle tree structure having a root node and any desired number of nodes extending therefrom. The general shape, size, etc., of the tree structure may vary depending on a number of factors. For example, in some approaches the Merkle tree structure may be formed to replicate the general structure of a number of remote locations (e.g., leaf nodes) that are connected to a central server acting as an intermediary between requesting clients and the stored data, e.g., as would be appreciated by one skilled in the art after reading the present description.

It follows that operation 306 may include computing a number of different cryptographic values based on the signature scheme that is implemented. In some approaches, operation 306 includes identifying locations that are connected to (e.g., in communication with) node 301, establishing relationships between the different locations connected to node 301, etc., and/or any other steps that may be taken to establish a trusted relationship between different leaf nodes (e.g., distributed locations) that are connected thereto.

For instance, in some approaches operation 306 includes creating instances of the initialized (e.g., chosen) one-time digital signature scheme and sending them to the respective leaf nodes. See operations 306*a*, 306*b*, 306*c*. In other words, operation 306 may include generating a single instance of the one-time digital signature scheme for each respective leaf node. Moreover, the digital signature instances may be sent to the leaf nodes individually (e.g., sequentially) as the instances are generated, in parallel as a batch to each of the respective leaf nodes, etc. Each of the leaf nodes that are connected to a central node may thereby receive an instance. This desirably spreads the ability to create cryptographic signatures across the different (and often distant or separated) leaf nodes. In turn, approaches herein are able to significantly shorten the individual digital signature length, thereby reducing compute overhead, overall latency, etc. According to one example, which is in no way intended to be limiting, operation 306 includes initializing a Lamport signature scheme across the nodes 301, 302, 303, 304.

In some approaches, operation 306 includes generating, receiving, identifying, etc., various cryptographic digital signature keys that may be used to form digital signatures. Moreover, operation 306 includes storing a copy of the digital signature instances at node 301, preferably in a secure location at node 301. According to one approach, the cryptographic digital signature instances are stored in a secure software environment at node 301 (e.g., see secure software environment 236 in FIG. 2). In other approaches, specific portions of memory at node 301 may be designated and configured as secure storage that is used to save the generated instances. The cryptographic digital signature instances (e.g., keys) are preferably formed in corresponding pairs of a public information and a private information. As mentioned above, while public information may be removed from a secure software environment and shared publicly in some approaches, the private information preferably remains hidden (e.g., secure).

Depending on the approach, operation 306 may be performed periodically, in response to a predetermined condition being met (e.g., in response to a number of available digital signature instances falling below a predetermined range), etc. It follows that a supply of digital signature instances is preferably available to satisfy any inquiries (e.g., data requests) that may be received over time. For instance, sources (e.g., users) may initiate session requests with a server configured to support protected data retrieval, e.g., using cryptographic digital signatures. The session requests may correspond to sensitive data that is preferably protected (or verified) by one or more security based measures, e.g., such as cryptographic digital signatures. The process of accessing the sensitive data may thereby involve digitally signing the data or overarching file and/or verifying data that has already been digitally signed, e.g., as will be described in further detail below.

Over time, requests involving the secure data are received. For instance, operation 308 includes receiving a data request from a source. In some approaches, the source of the session request may be a user. However, the session request may be received from a running application, as a result of one or more AI based models generating certain outputs, automatically in response to a predetermined condition being met, etc. Thus, the session request may be received from various sources, e.g., that may be connected to the same network. It should also be noted that one or more data requests may be received at various times. One or more of the operations in method 300 may thereby be repeated in an iterative fashion in response to each data request that is received, and which involves sensitive data.

The received data request is preferably inspected and evaluated to determine the type of data request. While data write operations may be performed using processes which would be apparent to one skilled in the art after reading the present description, read requests are evaluated further. For instance, method 300 advances to operation 310 in response to determining that a data read request has been received. There, operation 310 includes determining whether the received data read request involves sensitive data that is distributed across two or more remote locations. For instance, operation 310 includes determining whether portions of the requested data are stored (e.g., spread) across at least some the nodes 302, 303, 304. In response to determining the requested data is not distributed across different remote locations (e.g., leaf nodes), method 300 advances to operation 312. There, operation 312 includes issuing the read request to the single location that the requested data is stored, while operation 314 includes receiving the requested data before satisfying the read request received in operation 308.

Returning to operation 310, method 300 advances directly to operation 316 in response to determining that the requested data is distributed across different remote locations (e.g., leaf nodes). There, operation 316 includes splitting the data read request into portions that correspond to the data that is stored at each of the respective remote locations. Operations 318a, 318b, 318c further include distributing the portions of the read request to the respective remote locations at nodes 302, 303, 304. In other words, operations 318a, 318b, 318c include distributing portions of the data request to the corresponding leaf nodes.

In response to receiving the portions of the read request at nodes 302, 303, 304, each of the nodes compute cryptographic values for the respective leaf node. See operations 320a, 320b, 320c. In other words, each of the nodes 302, 303, 304 use the respective received portion of the read request, and the instance of the one-time digital signature scheme (sent in operations 306a, 306b, 306c above) to compute cryptographic values that allow the respective nodes to digitally sign and protect local data, e.g., before sending it over a network back to node 301. The values computed at each of the nodes 302, 303, 304 are preferably based at least in part on the public information in the respective one-time digital signature scheme instances, while the private information about the root node value remains stored (e.g., protected). In some approaches, operations 320a, 320b, 320c may utilize (e.g., apply) cryptographic values determined (e.g., computed) during the initialization of the one-time digital signature scheme (see operation 306 above).

With continued reference to FIG. 3A, operations 322a, 322b, 322c further include each of the nodes 302, 303, 304 signing the respective portions of the requested data. In other words, each of the nodes 302, 303, 304 use the cryptographic values determined in operations 320a, 320b, 320c and/or other information received from node 301, to create a signature that includes the public information of the given one-time digital signature scheme instance it obtained from node 301. The signed data is thereby protected and able to be sent over a public network without compromising the integrity (e.g., security) of the data, e.g., as would be appreciated by one skilled in the art after reading the present description.

From operations 322a, 322b, 322c, method 300 proceeds to operations 324a, 324b, 324c. There, operations 324a, 324b, 324c include sending the respective signed portions of the requested data from nodes 302, 303, 304, to node 301. In response to receiving the signed copies of the requested portions of data at node 301, method proceeds to operation 326. There, operation 326 includes accumulating (e.g., combining) the various signed portions of the requested data. Operation 326 may thereby keep track of which nodes have returned a signed copy of requested data in response to a portion of the request being sent thereto, and which nodes have not yet satisfied a relevant portion of the read request.

In response to determining that a signed portion of the requested data has been received from each of the requested nodes 302, 303, 304, method 300 proceeds to operation 328. In other words, method 300 advances to operation 328 in response to determining that all of the requested data has been received from the various storage locations distributed across leaf nodes. As noted above, this may also be referred to as having a complete "batch" of data from each location. In some approaches, node 301 verifies that a complete batch has been accumulated before sending the requested data to the source of the request. See operation 328. In other approaches, node 301 may actually send the signed portions of the requested data to the source of the request as they are received from the various nodes. Thus, node 301 may serve as a simple passthrough that directs the requested data to the source of the request.

In some approaches, node 301 may send instructions along with the signed portions of the requested data to the source of the data request that was received. The instructions (e.g., commands, executable files, requests, etc.) sent to the source may thereby cause the signed copies to be combined and batch verified. In other words, one or more of the operations in method 350 of FIG. 3B below may be performed in response to instructions sent from node 301 along with the requested data.

In response to sending the signed copies of the portions of requested data to the source, the data read request originally received in operation 308 has effectively been completed. However, the various portions of signed data are preferably verified at the source of the original read request, e.g., to ensure the received data has not been tampered with and is accurate. While the signed data may be verified at node 301 in some approaches, the source of the read request verifies the signed data in other approaches.

Figure 3B:
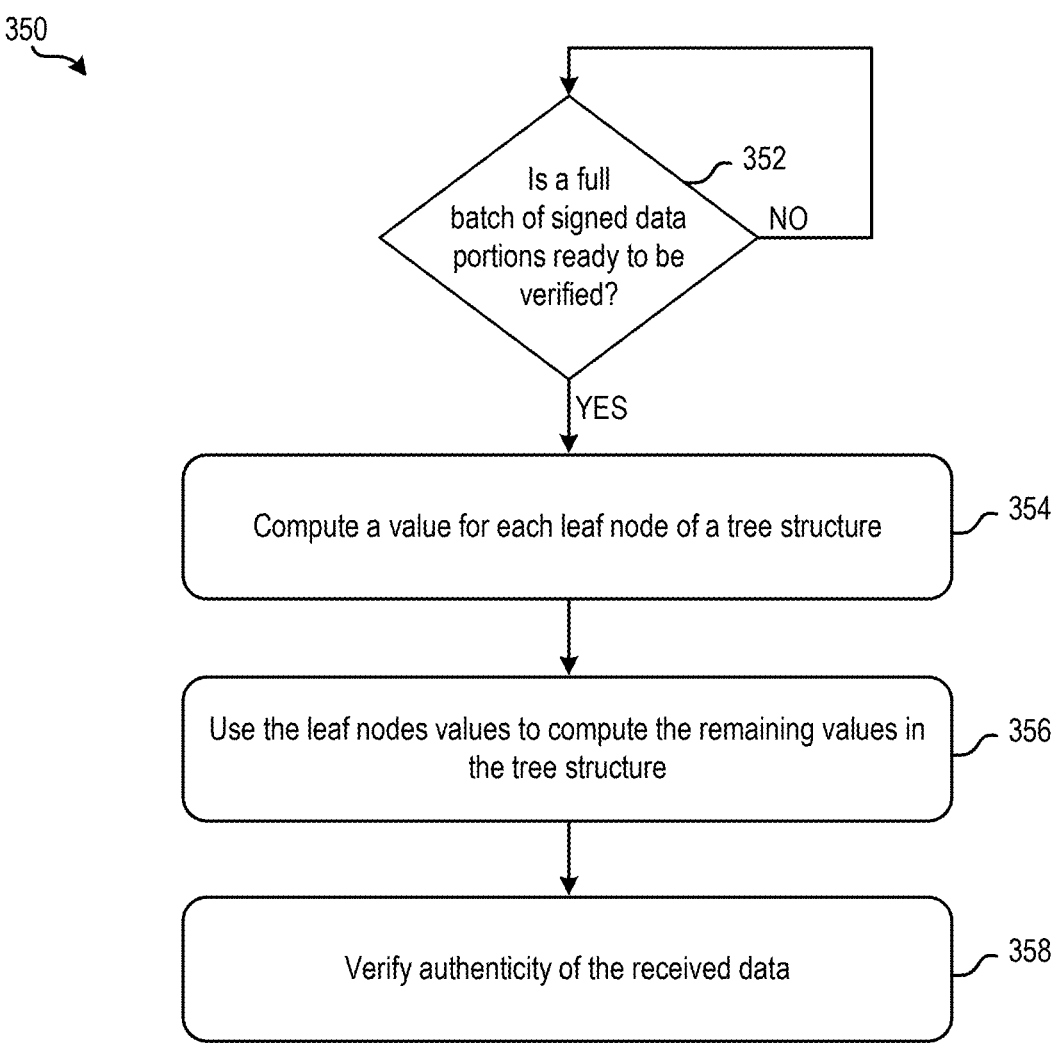
FIG. 3B is a flowchart of a method, in accordance with one approach.

Looking now to FIG. 3B, a flowchart of a method 350 for verifying received portions of data that have been signed with a cryptographic digital signature is shown according to one approach. The method 350 may be performed in accordance with the present invention in any of the environments depicted in FIGS. 1-3A, among others, in various approaches. Of course, more or less operations than those specifically described in FIG. 3B may be included in method 350, as would be understood by one of skill in the art upon reading the present descriptions.

Each of the steps of the method 350 may be performed by any suitable component of the operating environment. For example, one or more of the operations in method 350 may be performed by processors at a client location that issued a read request for sensitive data stored in a distributed manner across different leaf nodes. In various other approaches, the method 350 may be partially or entirely performed by a controller, a processor, a computer, etc., or some other device having one or more processors therein. Thus, in some approaches, method 350 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, operation 352 determines whether all of the requested data has been received. In other words, operation 352 includes determining whether a full batch of signed data has been received in response to an initial data request that was issued. As noted above, by implementing batch digital signature verification, approaches herein are able to significantly reduce the size of the signatures that are used. This desirably reduces compute overhead, network traffic, latency, etc., thereby improving performance overall. Moreover, signed portions of data have a consistent length, which causes the length of such digital signatures to not scale. In other words, the length of signed copies of data remain constant, regardless of the number of leaf nodes the signed copies are received from.

In response to determining that at least some (a portion) of the requested data has not yet been received from remote locations, method 350 is shown as returning to operation 352. Method 350 thereby continues to monitor the data that has been received while waiting for an issued data read request to be satisfied.

In response to determining that all of the requested data has been received from the various remote locations, method 350 proceeds from operation 352 to operation 354. There, operation 354 of method 350 includes computing values that correspond to the initialized one-time digital signature scheme. It follows that in some approaches, operation 354 includes computing a value for each leaf node of a tree structure. As noted above, a tree structure may be established during the process of initializing the one-time digital signature scheme. Accordingly, the tree structure may be sent to the source of the data request during the initialization process, in response to receiving a data request, along with the signed portions of the requested data, posted to a publicly available location (e.g., a website), etc. In some approaches, the tree structure is a Merkle tree structure.

The values are computed in preferred approaches using information included in an instance of the initialized one-time digital signature scheme. Thus, the source of the read request may receive an instance of the initialized one-time digital signature scheme along with information corresponding to the tree structure. Public information included in the received instance may be used to determine the value that corresponds to a given leaf node.

Method 350 advances from operation 354 to operation 356. There, operation 356 includes using the leaf nodes values to compute the remaining values in the tree structure. As noted above, the size, structure (e.g., shape), style, etc. of the tree structure created (e.g., during initialization of the one-time digital signature scheme). Thus, the number of node values that are computed in operation 356 may vary depending on the particular approach. As noted below, the values of each node that extends downstream from a local base node may be combined to determine the value of that base node. Thus, by combining and computing various values, operation 356 is desirably able to determine a value of a root node of the tree structure. The root node may thereby be used to verify all of the received data as a single batch.

Method 350 thereby proceeds from operation 356 to operation 358. There, operation 358 includes verifying authenticity of the received data. The verification in operation 358 is preferably performed by comparing the root node value computed using the received portions of data, with stored cryptographic information. For instance, the root node value may be compared to the private information in an instance of the one-time digital signature scheme. As noted above, the source of a read request may receive an instance of the one-time digital signature scheme during the initialization phase, in response to issuing a read request, along with the signed portions of the requested data, etc.

In situations where operation 358 determines the received portions of signed data are valid and an accurate representation of the requested data, the received data may be used as desired. For instance, the read request may be issued in association with an application referencing the requested data. The received data may thereby be input in the application in response to verifying it. However, in response to determining at least some of the received data is not verified (e.g., has been tampered with), the received data may be discarded. In some approaches, a warning may also be sent to an administrator tasked with manging the secure data.

It follows that approaches herein are desirably able to improve performance by reducing the size of the signatures used to ensure sensitive data remains protected. Moreover, this data protection does not come at a cost to performance, as latency, network bandwidth, compute overhead, etc. are significantly reduced. In addition, while approaches herein implement batch digital signature verification (also referred to herein as "batch verification") rather than being able to verify individual signatures (e.g., at least some approaches herein may be unable to verify cryptographic signature received from a single location), the length of the digital signatures used by approaches herein is significantly shorter than previously achievable, e.g., as will be described in further detail below.

While performing batch verification desirable improves performance as described above, in some approaches additional security measures may be taken. For instance, in some approaches, more than one copy of each signed portion of data may be sent from each respective remote location. According to an example, a first signed portion of data may be a legitimate copy of the requested data, while a second signed portion of data is a decoy. Adding one or more decoy copies of the signed data decreases the chances of an aggressor from improperly gaining access to secure data. For instance, even if an aggressor were to intercept signed data being sent from remote locations to a source of the request, the aggressor is unable to determine which copy of the signed data is even an accurate representation of the actual data being requested and retrieved.

Thus, returning momentarily to FIG. 3A, node 301 may receive two or more different copies of the signed data portions from the respective nodes 302, 303, 304. As noted above, one of the copies is an accurate (yet cryptographically signed) representation of the data that was actually requested, while the others received from a same node may be decoy copies. For example, decoy copies may include random data that has been signed by applying a false (e.g., different) configuration of the one-time digital signature scheme. Node 301 may simply pass all copies of the signed data to the source of the request in some approaches. In other approaches, node 301 may be configured to identify the accurate copies of the signed data and only send those accurate copies to the source of the request.

In response to receiving the copies of the signed data, the source may compare the information included in each copy to private information in the instance at the source. This allows the source to identify the correct (e.g., accurate) copies of the signed data, and these "correct" copies of the signed data may further be used as desired.

According to an in-use example, which is in no way intended to be limiting, a Merkle tree digital signature scheme may be initialized using Lamport signatures. In other words, using a given one-time digital signature algorithm, a tree may be constructed, that can further be used as a digital signature method capable of creating many digital signatures. In Merkle tree setup, a signer initializes one-time digital signature scheme $2^k$-times, so there are pairs $T\_i = (PU\_i, PR\_i)$ for every i between 1 and $2^k$. The signer may thereby build a balanced (or unbalanced) tree structure (e.g., binary tree structure) using the PU_i objects. For brevity, it is assumed that a balanced tree with $2^k$ nodes is created, but there is no requirement for that, as the tree structure can be unbalanced, and the number of nodes does not need to be a power of 2.

Figure 4A:
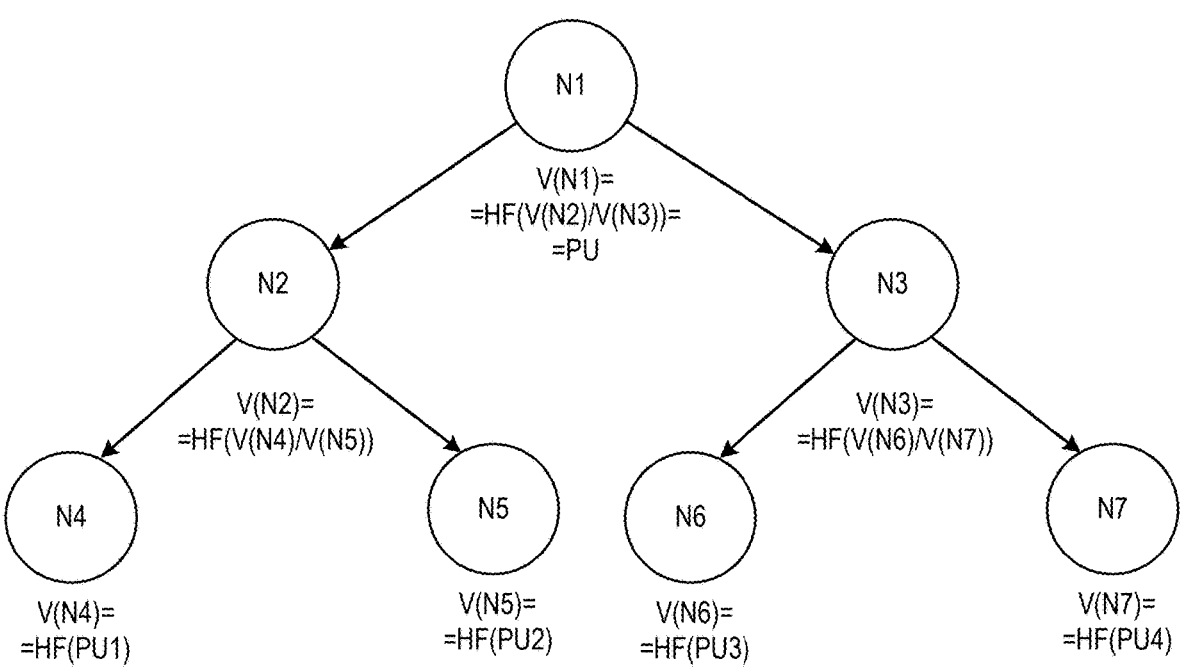
FIG. 4A is a representational view of a tree structure, in accordance with an in-use example.

Looking still to the present in-use example, the tree consists of $2^k$ leaves and each i-th leaf corresponds to PU_i. It follows that there are $2^{(k+1)}-1$ nodes in the tree, denoted as N_t for every t between 1 and $2^{(k+1)}-1$. Moreover, nodes may be denoted from the root down and from left to right, so the root node is denoted as N_1. Each node N_t is assigned with a value V(N_t) that is the corresponding PU_i (in this example $i=t-[2^k-1]$ because there are $2^k-1$ non-leaf nodes) if it is a leaf node or it is created based on values of direct children of it if it is non-leaf node. This value is obtained in such a way that it is not possible to guess it upfront or modify the child nodes values to obtain desired value for the parent node. The public data of the signer PU is the value of the root node, i.e. PU=V(N_1), and may be the only information that is published. The pairs T_i become a private data PR, although publishing information about all PU_i values for every i between 1 and $2^k$ does not compromise the scheme. In other words, it does not allow an adversary to gain any useful knowledge about the scheme setup. See FIG. 4A.

Figure 4B:
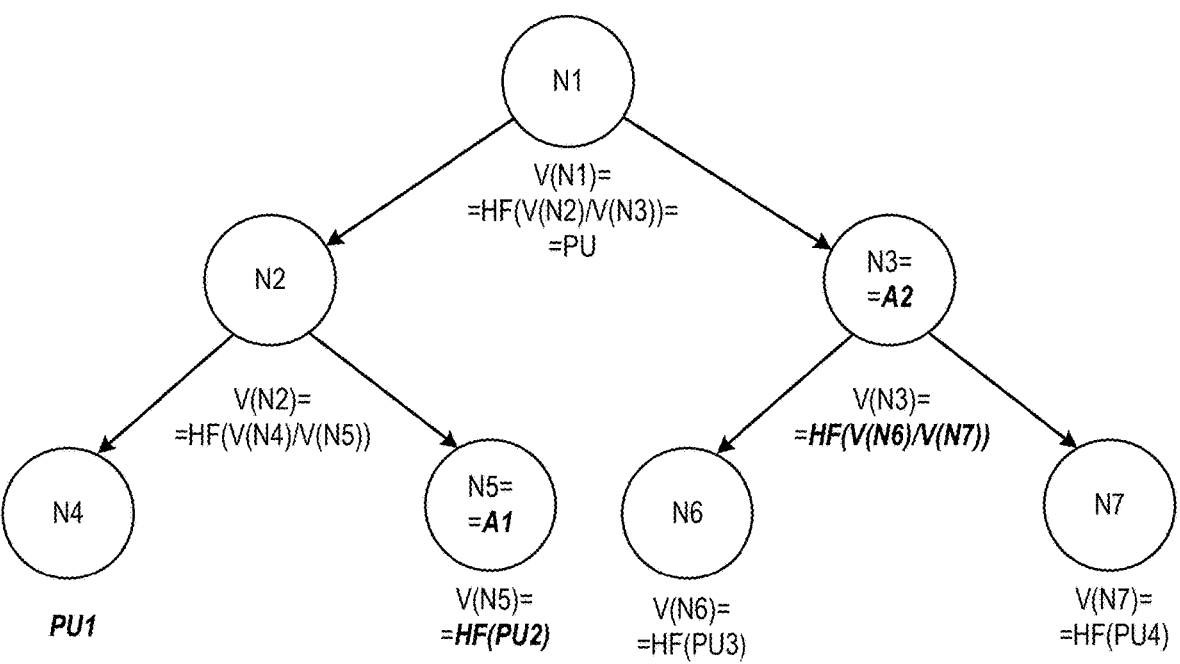
FIG. 4B is a representational view of a tree structure, in accordance with an in-use example.

To create a digital signature DS of data DA, assuming this is the i-th time (for every i between 1 and $2^k$) the signer signs the message using this setup, the signer takes the pair T_i from the private data PR and performs a digital signature DS_i using it (as T_i is a one-time digital signature scheme). However, because PU_i is not publicly available, it needs to be also appended as a part of the digital signature DS, as well as all the intermediary nodes values in the Merkle tree that are needed to compute the value V(N_1) again and compare it with the value published as PU. Intermediary nodes are thereby denoted as A_r, where r is between 1 and k. Accordingly, A_1 is the sibling of N_(2^k-1+i), and A_(s+1) is the sibling of the parent of A_s (for every s between 2 and k-1). FIG. 4B illustrates these intermediary nodes according to the present in-use example.

The digital signature may thereby be as follows: DS=DS_i|PU_i|V(A_1)| . . . |V(A_k). In response to receiving data DA with the digital signature DS, anyone can use DS_i and PU_i extracted from DS to verify authenticity of data DA and using the public data PU and extracting the intermediary values V(A_1), . . . , V(A_k) as well as by computing value VO anyone can verify the PU_i is indeed on of the pairs generated during setup of this scheme. Approaches herein are thereby able to improve performance by significantly reducing the size of the signatures that are used. As it was mentioned, the drawback of this method is that the length of the digital signature in Merkle scheme is considerable, it can be easily seen by the formula for DS that it grows linearly with respect to k (logarithmically with respect to the number of messages that scheme is able to sign).

As noted above, the Merkle scheme may be initialized such that the signing ability is distributed across various remote locations (e.g., leaf nodes). For simplicity, it may be assumed that the number of nodes equals $2^k$. Now node N_i receives its own part of the private data, namely T_i (for every i between 1 and $2^k$). Each node, when signing the data, creates a signature DS=DS_i|PU_i. An immediate corollary stemming from this is that the length of such digital signature does not scale—it remains constant, regardless of the number k. This alone does not bring any security because anyone could initialize alternative one-time signature scheme T_i and create the signature. However, in response to all the nodes sending the data with such signatures to some selected receiver, that receiver is able to compute all the leaf nodes values V(N_(2^k)), . . . , V(N_(2^(k+1)-1)) which are equal to HF(PU_1), . . . , HF(PU_(2^k)). Using those values this receiver can compute all the nodes values in the Merkle tree, thus proving that these pairs where generated while the scheme was set up. And, as it was written earlier, each signature can be easily used to verify the authenticity of the data they came with, so ultimately all the data coming from those different nodes is verified in a batch fashion. In other words, all messages are verified or there is an indication about tampered information somewhere in the received data.

Some approaches may further introduce the ability to obfuscate the data in transit. According to another implementation, node $N_i$ receives the $T_i$ for every i between 1 and $2^k$. However, node $N_c$ (for some chosen c between 1 and $2^k$) is sending two messages: DA_1 with signature DS_1=DS_i1|PU_i1 and DA_2 with signature DS_2=DS_i2|PU_i2. In such scenario, the receiver that received the messages with the requested data and signatures is easily able to determine which from PU_i1, PU_i2 is the PU_i value that was used when setting up (e.g., initializing) the scheme. This may not be ensured by simply storing all the PU_i values for every i between 1 and $2^k$ (they are not available to anyone except the initializer of the scheme). Rather, anyone can create two different Merkle tree structures. The different structures they will differ only by the value in the node $N_{(2^k-1+i)}$, namely the first tree will have $V(N_{(2^k-1+i)})$=HF(PU_i1) and the second tree will have $V(N_{(2^k-1+i)})$=HF(PU_i2). It is thereby possible to compute all the values for the other nodes in both trees. The tree for which value of the root node $V(N_1)$ will equal to the published PU indicates which message was signed using the real PU_i from the scheme and which message was signed using some randomly initialized, alternative one-time signature scheme. There can be more than one node that is sending two different messages, and the receiver should still be able to quickly verify which set of messages consist of the real signed data. This way, an adversary who may intercept only part of the messages (unless it happens that whole real signed data is received) is totally uncertain which of the messages that were intercepted are parts of the real signed data (even if it happens that all the received messages are parts of the real signed data). Instead of one node $N_c$ sending two different messages, the scenario can also be implemented in such a way that there are nodes $N_{c1}$ and $N_{c2}$ and one of them is sending the real data while the other one is just sending a random data in order to make the adversary confused (so only one of the nodes $N_{c1}$ and $N_{c2}$ has the valid $T_c$ pair and is sending the real data, the other one is just faking the communication).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:

initializing a one-time digital signature scheme across two or more leaf nodes by: creating and sending instances of the one-time digital signature scheme to the respective leaf nodes;

in response to receiving a request for data from a source, portions of the requested data being stored across the leaf nodes, distributing portions of the data request to the corresponding leaf nodes;

receiving, from the leaf nodes, signed copies of the requested portions of data, the signed copies being formed using the instances sent to the respective leaf nodes;

causing the source to combine the signed copies and perform a batch verification of the combined signed copies; and sending the signed copies to the source.

2. The CIM of claim 1, wherein each instance includes a respective pair of public information and private information.

3. The CIM of claim 2, wherein each of the signed copies are formed using the private information in the instance sent to the respective leaf node.

4. The CIM of claim 1, wherein the operations are performed by a central node of a distributed network, the central node being coupled to the leaf nodes.

5. The CIM of claim 1, wherein the initializing of the one-time digital signature scheme across the leaf nodes includes implementing a Merkle tree structure.

6. The CIM of claim 1, wherein the signed copies have a consistent length.

7. The CIM of claim 1, further comprising:

receiving, from one or more of the leaf nodes, a decoy signed copy along with the respective one of the signed copies; and sending: an accumulation of the signed copies, and the at least one decoy signed copy, to the source.

8. The CIM of claim 7, wherein the decoy copy includes random data that has been signed.

9. A computer program product (CPP), comprising:

a set of one or more computer-readable storage media; and program instructions, collectively stored in the set of one or more computer- readable storage media, for causing a processor set to perform the following computer operations:

initialize a one-time digital signature scheme across two or more leaf nodes by: creating and sending instances of the one-time digital signature scheme to the respective leaf nodes;

in response to receiving a request for data from a source, portions of the requested data being stored across the leaf nodes, distribute portions of the data request to the corresponding leaf nodes;

receive, from the leaf nodes, signed copies of the requested portions of data, the signed copies being formed using the instances sent to the respective leaf nodes; and send an accumulation of the signed copies, and at least one decoy signed copy received from one or more of the leaf nodes, to the source.

10. The CPP of claim 9, wherein each instance includes a respective pair of public information and private information.

11. The CPP of claim 10, wherein each of the signed copies are formed using the private information in the instance sent to the respective leaf node.

12. The CPP of claim 9, wherein the operations are performed by a central node of a distributed network, the central node being coupled to the leaf nodes.

13. The CPP of claim 10, wherein the initializing of the one-time digital signature scheme across the leaf nodes includes implementing a Merkle tree structure.

14. The CPP of claim 9, wherein the signed copies have a consistent length.

15. The CPP of claim 9, wherein the program instructions are for causing the processor set to further perform the following computer operations:

cause the source to combine the signed copies and perform a batch verification of the combined signed copies.

16. The CPP of claim 9, wherein the program instructions are for causing the processor set to further perform the following computer operations:

receive, from one or more of the leaf nodes, the decoy signed copy along with the respective one of the signed copies.

17. The CPP of claim 16, wherein the decoy copy includes random data that has been signed.

18. A computer system (CS), comprising:
a processor set;
a set of one or more computer-readable storage media;
program instructions, collectively stored in the set of one or more storage media, for causing the processor set to perform the following computer operations:

initialize a one-time digital signature scheme across two or more leaf nodes by: creating and sending instances of the one-time digital signature scheme to the respective leaf nodes;

in response to receiving a request for data from a source, portions of the requested data being stored across the leaf nodes, distribute portions of the data request to the corresponding leaf nodes;

receive, from the leaf nodes, signed copies of the requested portions of data, the signed copies being formed using the instances sent to the respective leaf nodes; and send an accumulation of the signed copies, and at least one decoy signed copy received from one or more of the leaf nodes, to the source.

19. The CS of claim 18, wherein the program instructions are for causing the processor set to further perform the following computer operations:

receive, from one or more of the leaf nodes, the decoy signed copy along with the respective one of the signed copies wherein the decoy copy includes random data that has been signed.

* * * * *